(12) United States Patent
Kang

(10) Patent No.: US 10,484,789 B2
(45) Date of Patent: Nov. 19, 2019

(54) MICRO-SPEAKER HAVING AN AIR ADSORBENT

(71) Applicant: EM-TECH. Co., Ltd., Busan (KR)

(72) Inventor: Ghi Yuun Kang, Seoul (KR)

(73) Assignee: EM-TECH. CO., Ltd., Busan (KR)

( * ) Notice: Subject to any disclaimer, the term of this patent is extended or adjusted under 35 U.S.C. 154(b) by 62 days.

(21) Appl. No.: 15/392,443

(22) Filed: Dec. 28, 2016

(65) Prior Publication Data
US 2017/0188137 A1   Jun. 29, 2017

(30) Foreign Application Priority Data

Dec. 29, 2015  (KR) .......................... 10-2015-0188533

(51) Int. Cl.
| | | |
|---|---|---|
| *H04R 1/28* | (2006.01) | |
| *B01J 20/18* | (2006.01) | |
| *B01J 20/28* | (2006.01) | |

(52) U.S. Cl.
CPC ................................. *H04R 1/288* (2013.01)

(58) Field of Classification Search
CPC ........ H04R 1/288; H04R 1/2811; B01J 20/18; B01J 20/28004; B01J 20/28061; B01J 20/28069
USPC ........................................................ 181/151
See application file for complete search history.

(56) References Cited

U.S. PATENT DOCUMENTS

| | | | |
|---|---|---|---|
| 4,356,882 A | 11/1982 | Allen | |
| 4,657,108 A * | 4/1987 | Ward | ................... H04R 1/2803 181/149 |
| 7,953,240 B2 * | 5/2011 | Matsumura | .......... H04R 1/2803 381/150 |
| 8,292,023 B2 | 10/2012 | Slotte | |

(Continued)

FOREIGN PATENT DOCUMENTS

| | | |
|---|---|---|
| EP | 2003924 A1 | 12/2008 |
| EP | 2424270 B1 | 5/2014 |

(Continued)

OTHER PUBLICATIONS

"Zeomics—All Available Zeolite Structures", Computer-Aided Systems Laboratory, Princeton University, Last updated Jul. 31, 2014, Accessed online at http://helios.princeton.edu/zeomics/cgi-bin/list_structures.pl on Dec. 28, 2016.

(Continued)

*Primary Examiner* — Forrest M Phillips
(74) *Attorney, Agent, or Firm* — Murphy, Bilak & Homiller, PLLC

(57) ABSTRACT

The present invention relates to a micro-speaker for use in a small electronic device, and more particularly, to a micro-speaker having an enclosure applied thereto and having an air adsorbent which can improve the low frequency sound quality. According to the present invention, it is possible to provide a micro-speaker which shows excellent improvement in the low frequency characteristics, regardless of a mass ratio of silicon to aluminum of an air adsorbent, and also possible to provide a micro-speaker which shows (Continued)

excellent improvement in the low frequency characteristics at a low cost, by reducing a mass ratio of silicon to aluminum, as compared with the conventional microspeaker having an air adsorbent.

7 Claims, 3 Drawing Sheets

(56) References Cited

U.S. PATENT DOCUMENTS

| | | | |
|---|---|---|---|
| 8,335,333 B2 | 12/2012 | Saiki et al. | |
| 8,687,836 B2 | 4/2014 | Lin | |
| 8,965,031 B2 | 2/2015 | Shinyama et al. | |
| 9,430,998 B2 | 8/2016 | Backman | |
| 2008/0170737 A1* | 7/2008 | Saiki | H04R 1/2803 381/346 |
| 2009/0245562 A1 | 10/2009 | Saiki et al. | |
| 2010/0206658 A1* | 8/2010 | Slotte | H04R 1/225 181/151 |
| 2010/0329498 A1 | 12/2010 | Rouvala et al. | |
| 2013/0308812 A1 | 11/2013 | Shen | |
| 2014/0037119 A1* | 2/2014 | Yuasa | H04R 1/02 381/346 |
| 2014/0064540 A1* | 3/2014 | Lin | H04R 1/2803 381/346 |
| 2015/0072723 A1 | 3/2015 | Schöffmann et al. | |
| 2015/0358721 A1 | 12/2015 | Wang | |
| 2016/0345090 A1 | 11/2016 | Wilk et al. | |
| 2017/0353785 A1 | 12/2017 | Choi et al. | |

FOREIGN PATENT DOCUMENTS

| | | |
|---|---|---|
| JP | 2007288712 A | 11/2007 |
| KR | 1020070119648 A | 12/2007 |

OTHER PUBLICATIONS

First, Eric et al., "Zeomics database Zeolite FER", A Computational characterization of zeolite porous networks: an automated approach, Physical Chemistry Chemical Physics, 13(38), 2011, accessed online at http://helios.princeton.edu/zeomics/cgi-bin/view_structure.pl?src=iza&id=FER on May 24, 2017.

Ruthven, D.M., "Characterization of zeolites by sorption capacity measurements", Microporous and Mesoporous Materials, Elsevier, Amsterdam, NL, vol. 22, No. 4-6, Jun. 30, 1998, pp. 537-541.

Wright, J.R., "The Virtual Loudspeaker Cabinet", Journal of the Audio Engineering Society, Audio Engineering Society, New York, NY, US, vol. 51, No. 4, Apr. 2003, pp. 244-247.

"Japan Association of Zeolite (website homepage)", Available online at: http://www.jaz-online.org/introduction/qanda.html. Machine translation by Google Translate attached, 1999, pp. 1-7.

\* cited by examiner

MICRO-SPEAKER HAVING AN AIR ADSORBENT

PRIORITY CLAIM

The present application claims priority to Korean Patent Application No, 10-2015-0188533 filed on 29 Dec. 2015, the content of said application incorporated herein by reference in its entirety.

TECHNICAL FIELD

The present invention relates to a micro-speaker for use in a small electronic device, and more particularly, to a micro-speaker having an enclosure applied thereto and having an air adsorbent which can improve the low frequency sound quality.

BACKGROUND

A speaker converts an electrical energy into a mechanical energy to generate sound, using a voice coil present in an air gap according to Fleming's left hand rule. Recently, with the wide spread of a small electronic device requiring a small internal speaker, such as a smartphone, there are increasing demands for a small and slim micro-speaker.

As the micro-speaker is limited in terms of a size, shape, location of a sound emitting hole, etc., a structure for obtaining high sound quality in a limited space has been taken into account. Especially, an enclosure micro-speaker module has advantages in that the micro-speaker is provided in an enclosure casing serving as a resonance space, this enclosure casing is mounted in an electronic device, and the sound generated by the micro-speaker is resonated in and emitted from the enclosure casing, which can thereby reduce sound interferences and improve sound quality and sound volume. In particular, the resonance space of the speaker is a critical factor in the low frequency characteristics, and the larger the resonance space is, the more easily the low frequency sound can be reproduced and the more the reproducible frequency range can be increased.

Recently, a micro-speaker having an air adsorbent starts to be developed to further enhance such low frequency characteristics. Zeolite or activated carbon is put into an enclosure to define a virtual back volume, i.e., a resonance space, using adsorption and desorption of air molecules. European patent 2424270, U.S. patent publication 2015-0358721, and U.S. Pat. No. 8,687,836 disclose a speaker which uses zeolite to enhance the low frequency sound characteristics.

However, the conventional micro-speakers having zeolite have adopted expensive materials with a high mass ratio of silicon to aluminum so as to achieve goals such as improvement in the low frequency sound quality. In general, the higher the mass ratio of silicon to aluminum is, the more hydrophobic zeolite is, so only the mass ratio of silicon to aluminum has been considered as a major performance index for zeolite. It is because the hydrophobic air adsorbent less adsorbs water molecules and thus more adsorbs air molecules. Nevertheless, increasing the mass ratio of silicon to aluminum significantly increases a process cost and thus a unit cost, as a result of which the micro-speaker having the air adsorbent has not been widely spread in spite of its superior performance.

SUMMARY

The present invention has been made to solve the aforementioned problems in the prior art. An object of the present invention is to provide a micro-speaker which shows excellent improvement in the low frequency characteristics, regardless of a mass ratio of silicon to aluminum of an air adsorbent.

In addition, another object of the present invention is to provide a micro-speaker which shows excellent improvement in the low frequency characteristics at a low unit cost of production.

According to an aspect of the present invention for achieving the aforementioned objects, there is provided a micro-speaker including an enclosure, a speaker unit accommodated in the enclosure, a resonance space defined between the enclosure and the speaker unit, and an air adsorbent provided in the resonance space, wherein the air adsorbent is zeolite having at least 35% of channels with a size of 0.4 nm to 0.6 nm.

In some embodiments, at least some zeolites have a framework selected from FER, MFI, MEL, TON, and MFS.

In some embodiments, zeolite has a specific surface area BET of at least 400 $m^2/g$.

In some embodiments, zeolite is provided in the form of granules with a grain size of 0.2 mm to 0.5 mm.

In some embodiments, inner micropores of zeolite have a volume of 0.25 $cm^3/g$ to 0.35 $cm^3/g$ per unit mass.

In some embodiments, the air adsorbent is arranged in a specific portion of the resonance space.

In some embodiments, two or more air adsorbent arrangement portions are provided around the speaker unit.

In some embodiments, the air adsorbent arrangement portion surrounds the speaker unit in a non-continuous manner.

According to the present invention, it is possible to provide a micro-speaker which shows excellent improvement in the low frequency characteristics, regardless of a mass ratio of silicon to aluminum of an air adsorbent.

In addition, it is possible to provide a micro-speaker which shows excellent improvement in the low frequency characteristics at a low cost, by reducing a mass ratio of silicon to aluminum, as compared with the conventional micro-speaker having the air adsorbent.

Those skilled in the art will recognize additional features and advantages upon reading the following detailed description, and upon viewing the accompanying drawings.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION

Figure 1:
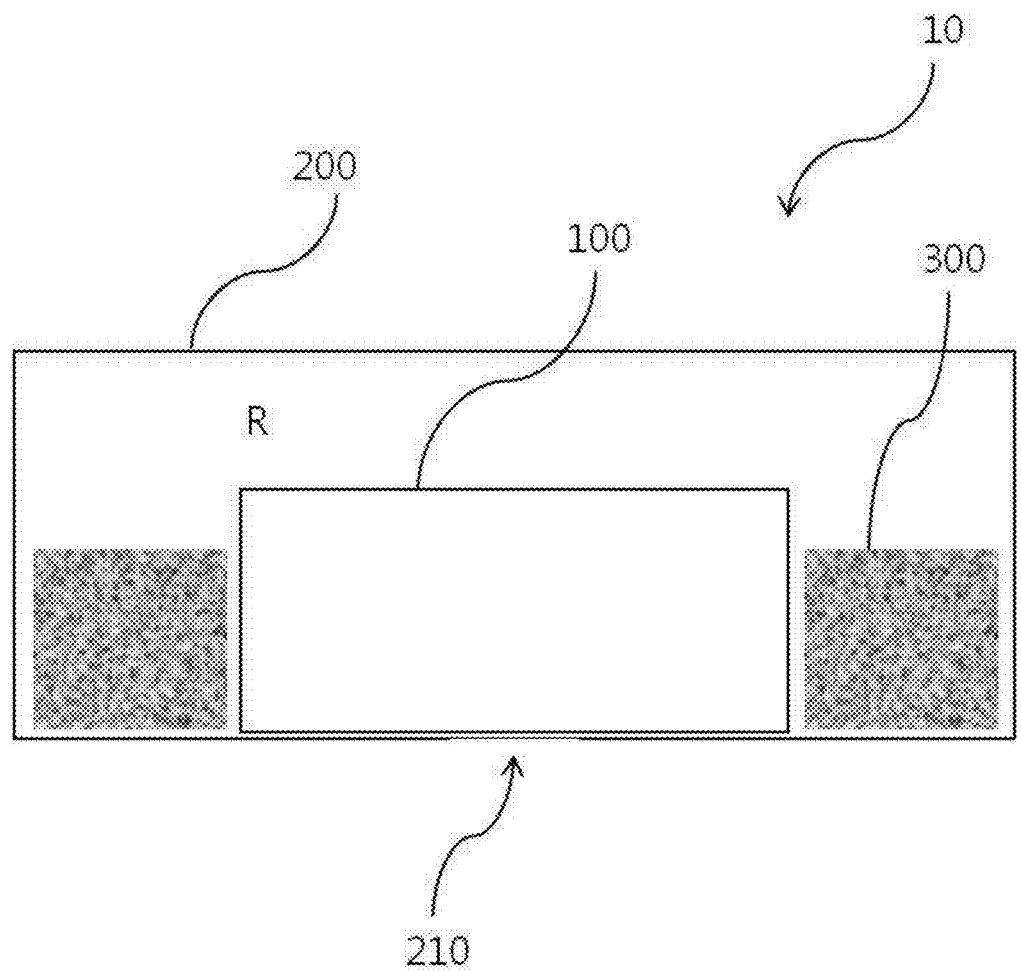
FIG. 1 is a schematic sectional view of a micro-speaker having an air adsorbent according to an embodiment.

Hereinafter, a preferred embodiment of a micro-speaker having an air adsorbent according to the present invention will be described in detail with reference to the accompanying drawings. In the description, some reference numerals can be omitted for readability of the drawings in the case of equivalent structures or identical constructions being easily recognizable in the drawings.

FIG. 1 is a schematic sectional view of a micro-speaker 10 having an air adsorbent according to an embodiment of the present invention. The micro-speaker 10 may include a speaker unit 100, an enclosure 200, and an air adsorbent which can be located in a resonance space R defined therebetween. The speaker unit 100 is accommodated in the enclosure 200 to be protected from the outside. The speaker unit 100, which serves to receive an electric signal and generate sound, may include, e.g., a diaphragm, voice coil, and magnet.

The enclosure 200 can accommodate the speaker unit 100 and also include the resonance space R where the sound generated by the speaker unit 100 can be resonated. The enclosure 200 may have a sound emitting hole 210 at its one side. An air adsorbent arrangement portion 300 in which the air adsorbent is arranged may be defined in the resonance space R as a separate space.

Figure 2:
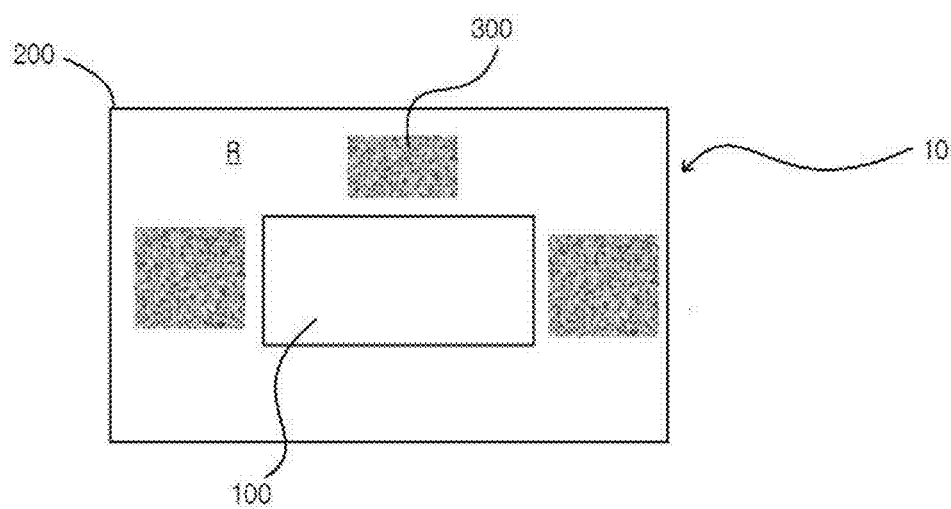
FIG. 2 is a schematic top view of the micro-speaker having the air adsorbent.

FIG. 2 is a schematic top view of the micro-speaker 10 having the air adsorbent according to the embodiment of the present invention. FIG. 2 schematically shows the speaker unit 100 and the air adsorbent arrangement portion 300 which are arranged in the resonance space R. Although two or more air adsorbent arrangement portions 300 may be provided around the speaker unit 100, three air adsorbent arrangement portions 300 are shown in FIG. 2. The enclosure 200 may be formed in a more complicated shape than a rectangle dependent upon where the micro-speaker 10 is installed, which may put restrictions on the air adsorbent arrangement portion 300. Therefore, it is preferable that the air adsorbent arrangement portion 300 should surround the speaker unit 200 especially in a non-continuous manner.

For example, zeolite, which is an aluminum silicate mineral, may be arranged in the air adsorbent arrangement portion 300. Commercially available zeolites are mostly artificially synthesized and commonly produced in the form of granules for ease of use. Zeolites have micropores formed therein and show selective molecule adsorption characteristics according to the channel size of the micropores. Zeolites are divided into a variety of different types by their components and structures, and the channel size or the channel size composition ratio of the micropores may vary accordingly.

The air is composed of nitrogen gas ($N_2$), oxygen gas ($O_2$), and vapor ($H_2O$), and the dry air almost constantly contains 78% of nitrogen gas and 21% of oxygen gas. A virtual back volume which can be created by the micro-speaker having the air adsorbent can be smoothly created when the air adsorbent can adsorb a sufficient amount of air, i.e., nitrogen gas and oxygen gas, so the channel size of the micropores of zeolite needs to be greater than the size of the air molecules. It is known that the size of the nitrogen gas molecules is about 0.4 nm and the size of the oxygen gas molecules is very slightly smaller. When the channel size is greater than the size of the nitrogen gas molecules and the size of the oxygen gas molecules, zeolite can smoothly adsorb such molecules. However, since zeolites have unique micropore size distributions according to their structures, i.e., frameworks, it is necessary to optimize which size distribution results in significant performance improvement in the low frequency sound quality of the micro-speaker.

Figure 3:
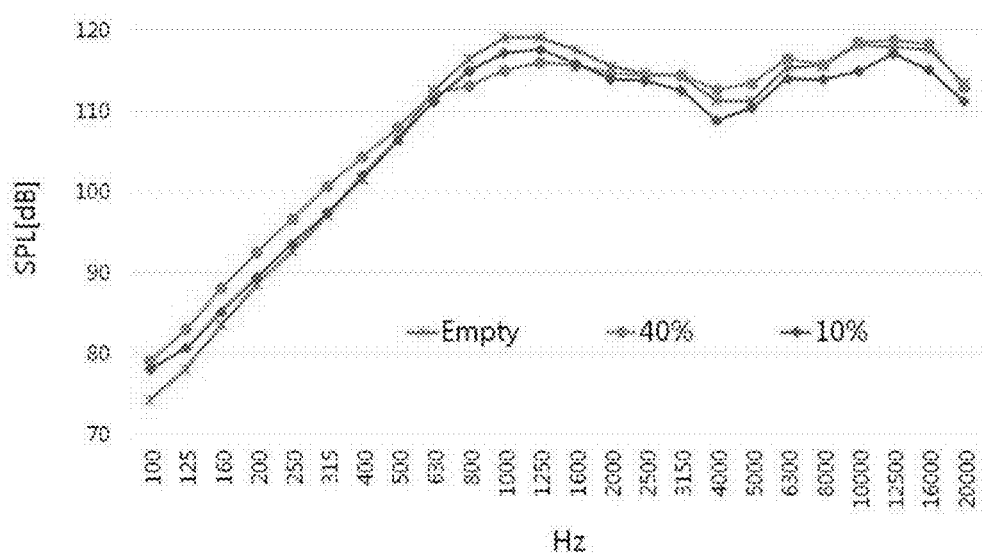
FIG. 3 is a graph showing changes in a sound pressure level based on frequencies, which are measured after zeolites with different air channel distribution ratios are applied as an air adsorbent.

FIG. 3 is a graph showing changes in a sound pressure level (dB) based on frequencies (Hz), which are measured after zeolites with different distribution ratios of channels having a size of 0.4 nm to 0.6 nm (hereinafter, referred to as 'air channels') are applied as the air adsorbent of the micro-speaker 10 of FIG. 1. It can be seen from the graph that the low frequency sound pressure level has been significantly improved since the air channel distribution ratio reaches 40%, as compared with the non-application of the air adsorbent. For some margin, preferably, zeolite having at least 35% of air channels can be efficiently used as the air adsorbent. The frameworks of zeolites meeting such restrictions include at least FER, MFI, MEL, TON, and MFS (Database of Zeolite Structures, Princeton University, http://helios.princeton.edu/zeomics/cgi-bin/list_structures.pl).

Figure 4:
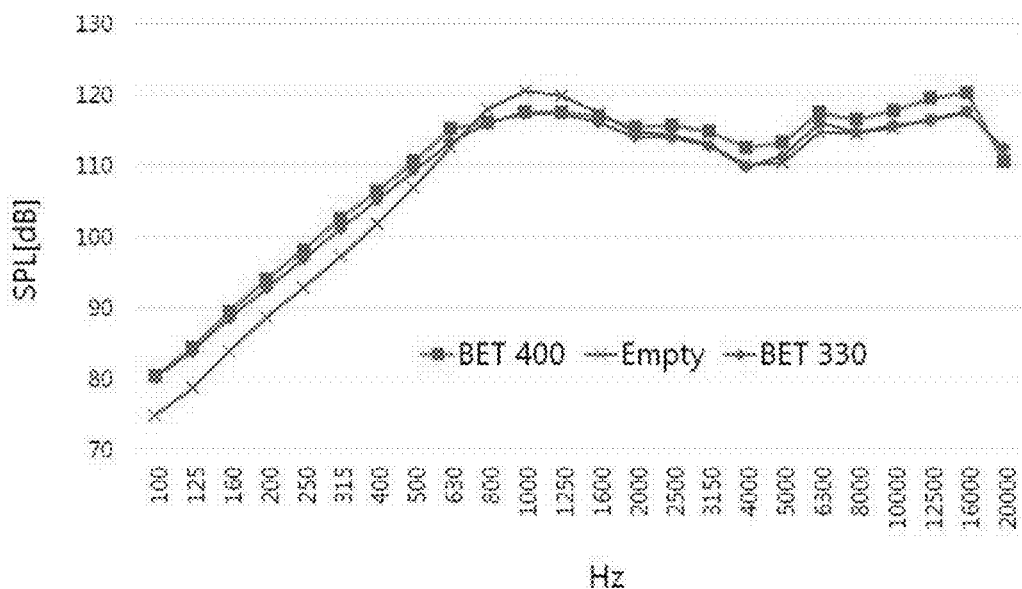
FIG. 4 is a graph showing changes in a sound pressure level based on frequencies, which are measured after zeolites with different specific surface areas are applied as the air adsorbent.

FIG. 4 is a graph showing changes in a sound pressure level (dB) based on frequencies (Hz), which are measured after zeolites with different specific surface areas (measured using Brunauer-Emmett-Teller equation) are applied as the air adsorbent of the micro-speaker 10 of FIG. 1. As the adsorption occurs on the surface of the air adsorbent, the larger the specific surface area of the air adsorbent is, the higher the adsorption efficiency is. Therefore, the larger the specific surface area of the air adsorbent employed by the micro-speaker 10 is, the more the low frequency sound quality improves. It can be seen from the graph that zeolite having a BET specific surface area of at least 400 $m^2/g$ remarkably improved the low frequency sound quality. The micropores of zeolite, which have a volume of 0.25 $cm^3/g$ to 0.35 $cm^3/g$ per unit mass, guarantee sufficient air molecule adsorption capability.

As mentioned above, zeolite is produced in the form of granules for ease of use. In particular, when zeolite is applied as the air adsorbent of the micro-speaker, if it is used in the form of powder, without secondary forming, or finely classified as excessively small grains, the air adsorbent may enter and contaminate other components of the micro-speaker 10. Furthermore, it is apparent that this outflow of the air adsorbent leads to the reduction of the virtual back volume. However, on the other hand, the secondary forming may have a detrimental effect on the air molecule adsorption capability of the air adsorbent. It is because the more the grain size of the granule increases, the more the surface area per unit mass, i.e., the specific surface area of the grain itself decreases.

Figure 5:
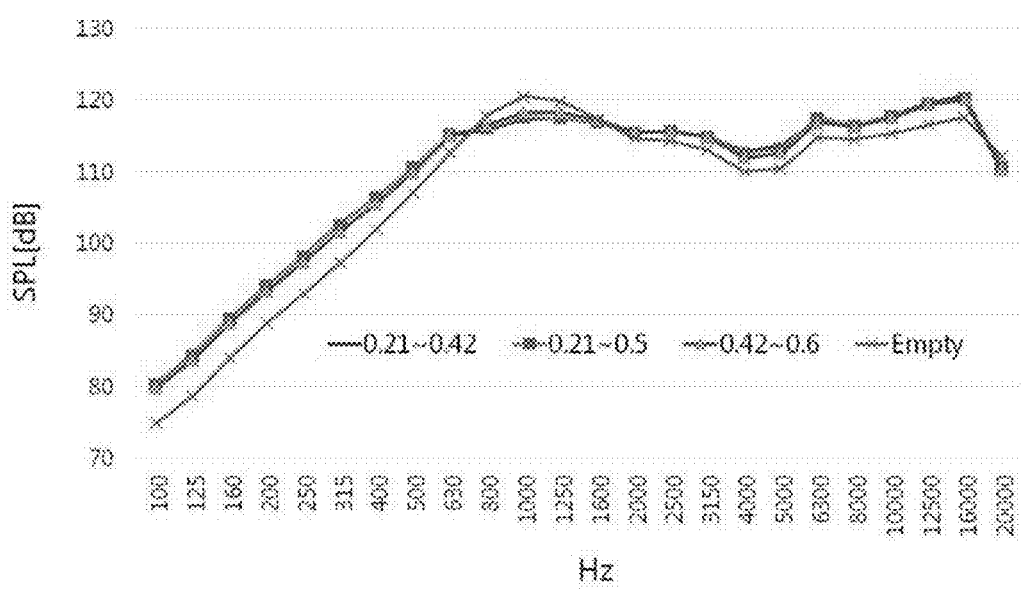
FIG. 5 is a graph showing changes in a sound pressure level based on frequencies, which are measured after zeolites with different grain sizes are applied as an air adsorbent.

FIG. 5 is a graph showing changes in a sound pressure level (dB) based on frequencies (Hz), which are measured after zeolites (secondarily formed into granules) with different grain sizes are applied as the air adsorbent of the micro-speaker 10 of FIG. 1. That is, the same type of zeolites are secondarily formed into different grain sizes, respectively, and compared with the non-application of the air adsorbent (Empty) in terms of improvement in the low frequency sound quality. A zeolite group having a grain size of 0.21 mm to 0.42 mm, a zeolite group having a grain size of 0.21 mm to 0.5 mm, and a zeolite group having a grain size of 0.42 mm to 0.6 mm show the almost identical improvement in the low frequency sound pressure level. Inter alfa, the zeolite group having a grain size of 0.21 mm to 0.42 mm and the zeolite group having a grain size of 0.21 mm to 0.5 mm are slightly more improved in the low frequency sound quality than the zeolite group having a grain size of 0.42 mm to 0.6 mm, while showing almost the same numerical values. Accordingly, it is most preferable to employ the zeolite or zeolite group having a grain size of 0.2 mm to 0.5 mm, which has a not-too-small grain size and shows satisfactory improvement in the low frequency sound quality, for ease of use.

As apparent from the above description of the experiments, it is possible to significantly improve the low frequency sound quality merely by selecting zeolite based on different pore characteristics instead of the mass ratio as in the prior art. Moreover, it is apparent that the above description is intended to assist better understanding of the embodiments of the present invention, and the scope of the present invention is not limited to any specific embodiment thereof.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A micro-speaker, comprising:
    an enclosure;
    a speaker unit accommodated in the enclosure;
    a resonance space defined between the enclosure and the speaker unit; and
    an air adsorbent provided in the resonance space,
    wherein the air adsorbent is zeolite having at least 40% of channels with a size of 0.4 nm to 0.6 nm,
    wherein the zeolite is provided in the form of granules with a grain size of 0.2 mm to 0.5 mm.

2. The micro-speaker of claim 1, wherein the zeolite is selected from the group consisting of FER, MFI, MEL, TON, and MFS.

3. The micro-speaker of claim 1, wherein the zeolite has a specific surface area BET of at least 400 $m^2/g$.

4. The micro-speaker of claim 1, wherein inner micropores of the zeolite have a volume of 0.25 $cm^3/g$ to 0.35 $cm^3/g$ per unit mass.

5. The micro-speaker of claim 1, wherein the air adsorbent is arranged in a specific portion of the resonance space.

6. The micro-speaker of claim 5, wherein the air adsorbent comprises two or more air adsorbent arrangement portions provided around the speaker unit.

7. The micro-speaker of claim 5, wherein the air adsorbent surrounds the speaker unit in a non-continuous manner.

* * * * *